CLASSIFICATION
9591 X
DIVISION.
Benjamin & Benjamin Darling
Pistols & Short Fire Arms.
Patented 13th April 1836.
A. Axle
B. Washer or flat ring
C. Cap or spring playing into notches cut in Breech
D. Lever
E. Nipper
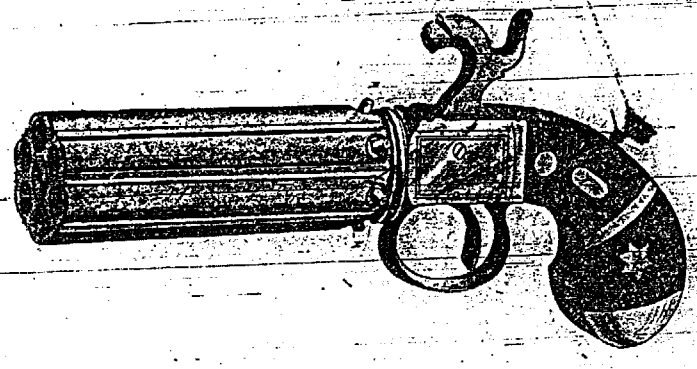
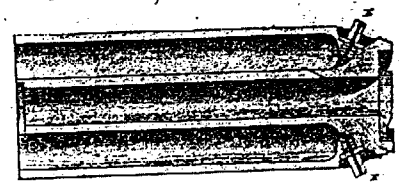
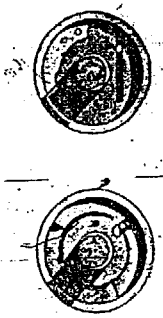
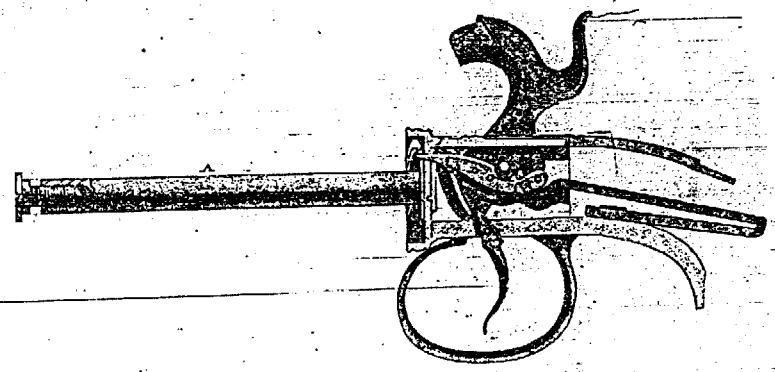
Patent Office 3rd Sept 1838.
Made under the direction of the Commissioner of Patents in conformity with act 3d March 1837.
G. L. Ellsworth

9591X

April 13, 1836

Barton Darling and Benjamin Darling Bellingham Mass

Letters Patent

The Schedule referred to in these Letters Patent and making part of the same containing
a description in the words of the said Barton Darling and Benjamin Darling them
selves of their "improvement in the construction of Pistols and Short Fire arms."

To all persons to whom these presents shall come. Be it known that we Barton Darling and
Benjamin Darling both of Bellingham in the County of Norfolk and State of Massachu-
setts have invented a new and useful improvement in the construction of Pistols
and short fire arms and that the following is a full and exact description of said
improvement and of the construction and operation of the said Pistol and Fire
arms as invented and improved by us. Viz We call the same "the rotary Pistol" and as
it consists of six bores or barrels [illegible] cut out of a single piece of steel placed in a
circle parallel with each and surrounding a common centre or bore which centre bore
is for the reception of an iron axle around which the barrels are to revolve. One end
of this axle is fastened into the stock of the piece at the breech of the barrels and the end at
the mouth of the barrels is fitted for the reception of a screw. This screw [illegible] into the axle
in a direction parallel to its axis and the screw prevents the barrels from slipping off from
the axle. The lock of the Pistol is in common form containing a mainspring a dog and
trigger for moving the common percussion hammer or cock. There is placed on the axle before
mentioned a revolving flat ring or Washer between the breech of the barrels and the stock
On the side of this ring towards the Barrels is [illegible] a small cog or spring which is fitted
to play into notches cut into the breech in a direction parallel with the axis of the axle
in the manner of a [illegible] wheel. There are six of these notches in the breech one for each
barrel. To the side of this ring next to the stock is attached a small lever resting on
a prop or fulcrum placed at a suitable distance from the breech. This lever is moved
by a band or strap fastened to the hammer, and instead of the flat ring or washer, a
spring hook is attached at the end of the lever. By drawing back the Hammer to a cock
the lever is depressed and the aforesaid ring with its cog is moved on the axle from
left to right and carries forward the barrels, bringing the nipple of the barrel directly an[d]
the hammer. The motion of the hammer in striking the nipple and caps, raises the lever
carries back the ring and cog far enough to catch into the next notch. By drawing ba[ck]
the hammer the first motion is repeated and so on till each nipple of each barrel is [illegible]

9591X April 13, 1836 brought under the hammer for discharge. Each barrel has its seperate nipple at the breech and the barrels of said Pistol are charged for firing in the usual manner of other fire arms. The machine work of the Pistol and lock is concealed within the stock except the hammer above and the trigger and guard below the same. The stock of the Pistol may be made of malleable cast iron, common wrought iron or other malleable metal.

What WE claim as our own invention and not previously known in the above described Pistol is, the six or more bores in a single piece of steel as described above also the rotary motion as mentioned in the specification and applied to the bores of the said Pistol and also the making of the Stock of said Pistol of malleable cast iron or wrought iron or other malleable metal.

Exd
W.G.C.

Witnesses
Williard Thayer
John Warrell

Barton Darling
Benjamin M. Darling

1697w..

(Granted April 13. 1836)

Drawing

1.